June 11, 1963  J. R. YANCEY  3,093,397
FLANGE CONNECTOR
Filed Feb. 15, 1960
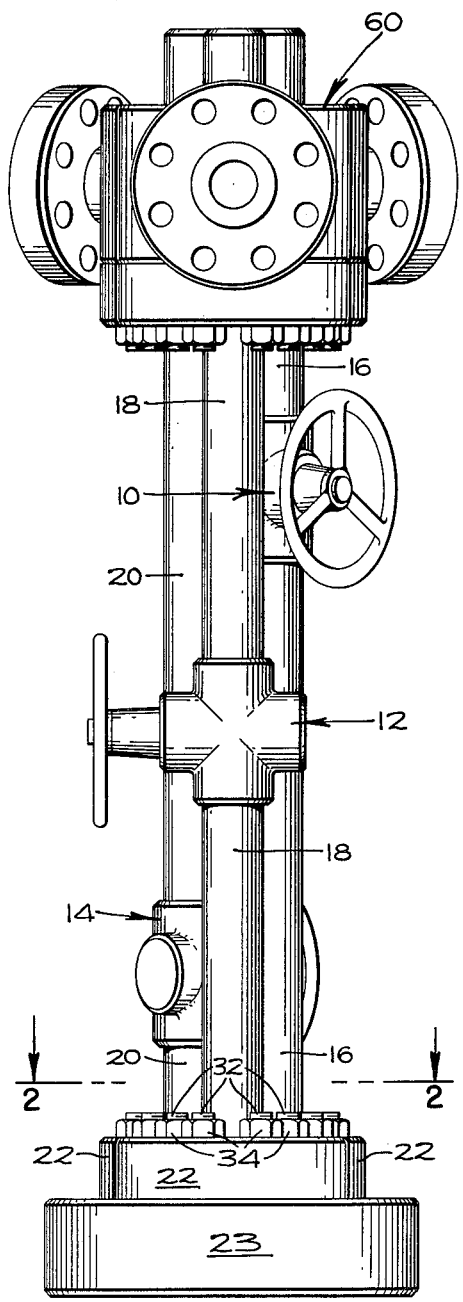
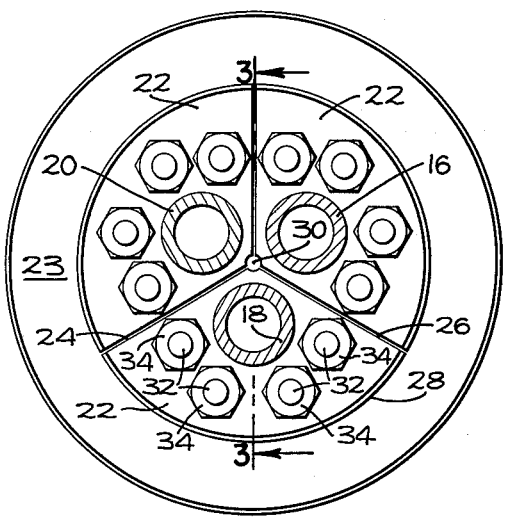
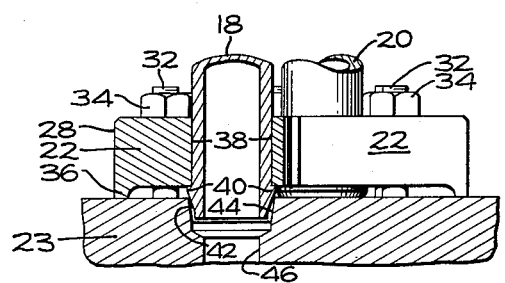
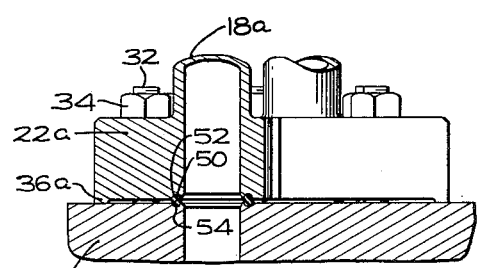
INVENTOR
JOHN R. YANCEY
BY *Hans G. Hoffmeister*
ATTORNEY

United States Patent Office 3,093,397
Patented June 11, 1963

3,093,397
FLANGE CONNECTOR
John R. Yancey, Houston, Tex., assignor, by mesne assignments, to FMC Corporation, San Jose, Calif., a corporation of Delaware
Filed Feb. 15, 1960, Ser. No. 8,865
3 Claims. (Cl. 285—137)

This invention pertains to a flange connection for tubing. More particularly, the present invention relates to a flange connection for connecting the master valves of a multiple string well installation to the tubing head.

An object of the invention is to provide a flange connection which permits the master valves to be clustered as closely together as the valve bodies will permit in order that a maximum size tubing can be employed within a minimum size casing.

Another object of the invention is to provide a multiple string valve cluster wherein the several valves are individually flanged to the tubing head so that they may each be independently removed therefrom without disturbing the remaining valves.

Other objects and advantages of the present invention will become apparent from the following description and the accompanying drawings, in which:

FIG. 1 is an elevation of a master valve cluster embodying the principles of the invention.

FIG. 2 is a plan of the flange connections of the present invention, being a section through the several tubing strings along line 2—2 of FIG. 1.

FIG. 3 is a section taken on line 3—3 of FIG. 2.

FIG. 4 is a section similar to FIG. 3 illustrating a modified form of the invention.

Heretofore it has been necessary to dispose the several tubing strings of a multiple string well installation considerably farther apart than would ordinarily be required to accommodate the bodies of valves included in the strings. This was done to provide space for the several conventional annular pipe flanges, each of which is used to secure one of the strings to the flat upper surface of the tubing head, and all of which, therefore, must lie in a common plane. While this type of installation provided for individual removal of the several valves without disturbing the remaining valves in the cluster, the greater spacing thereof required by the conventional flanges makes a relatively large diameter casing necessary in order to install multiple tubing strings of a given size.

Other installations of this type in the past have been made wherein the valve bodies are clustered together as close as their dimensions will permit in order to reduce the size of the casing needed to accommodate a given number of tubing strings of a given diameter. In such installations, the tubings connected to the valves were all connected to a common flange which in turn was bolted to the tubing head. In the first illustration given above the advantage of being able to individually remove the master valves was outweighed by the disadvantage of the large spacing between the several valves. In the second illustration, although the valves are grouped closely together, this type of installation suffers the disadvantage of not enabling individual removal of the valves.

A well installation incorporating the present invention, as illustrated in the drawings, is characterized by the combined advantages of individual removability of the valves and the desired close grouping thereof.

In the structure illustrated in FIG. 1, three master valves 10, 12 and 14 are incorporated in valve tubes, 16, 18 and 20, respectively, which are located as close together as the bodies of the valves will permit. Each of the valve tubes 16, 18 and 20 is provided with a sector shaped flange 22 adapted to be bolted to the tubing head bonnet 23. Since the several flanges are identical, only the flange 22 associated with the tube 18 will be described in detail.

Referring now to FIG. 2, it will be seen that in plan the flange 22 is of generally sector shape with two straight sides 24 and 26 diverging outwardly from each other at an angle of 120° (for a 3-valve cluster) and an arcuate outer edge 28 the arc of which is concentric about the center 30 of the valve cluster. A series of spaced bolt holes are provided in the outer, arcuate portion of the flange 22 angularly spaced about the axis of the tube 18 on an arc centered on said axis. These bolt holes are adapted to receive attachment studs 32 which are threaded into suitable tapped holes (not shown) in the tubing head bonnet 23. Nuts 34 are threaded onto the studs 32 and bear downwardly against the upper surface of the flange 22. A relatively narrow arcuate downwardly projecting abutment flange or shoulder 36 (FIG. 3) is provided along the arcuate edge 28 of the flange 22.

The tube 18 projects through a suitable bore 38 in the flange 22 and is provided adjacent its lower end with an outwardly projecting flange 40 which abuts the undersurface of the flange 22. The end of the tube 18 is provided with an inwardly tapered surface 42 which cooperates with a flared surface 44 in the upper end of the passageway 46 in the tubing head bonnet 23. When the attachment nuts 34 are tightened, the flange 36 bears against the upper surface of the tubing head bonnet 23. The flange 22 then pivots about the arc of engagement of the flange 36 to force the tapered end 42 of the tube 18 into the flared end of the passageway 46 in the tubing head 23 to effect tight sealing engagement therebetween, and thereby operatively connect the valve tube 18 into the tubing string of which it is a part and the major portion of which (not shown) extends downward from the tubing head bonnet 23.

In the modification illustrated in FIG. 4, the flange 22a is integral with the valve tube 18a. A suitable seal ring 50, concentric with the tube 18a, is interposed between the flange 22a and the tubing head bonnet 23a and is seated in suitable grooves 52 and 54 formed, respectively, in the facing surfaces thereof. In this instance, tightening of the attachment nuts 34 pivots the flange 22a about the arc of engagement of its abutment flange 36a with the top of the tubing head bonnet to apply suitable pressure to the seal ring 50.

It will be appreciated that each of the valve tubes 16, 18 and 20 is provided at both of its ends with similar flanges. In this manner, the valve tubes are not only connected to the tubing head bonnet 23 at their lower ends, but their upper ends are connected to the flow distribution assembly 60 (FIG. 1).

From the foregoing description it is evident that by use of the described flanges, a valve cluster is provided which permits individual removal of several valves from the cluster while also permitting the closest possible grouping of the valves, thus minimizing the size of casing necessary to accommodate the desired number of tubing strings of given size.

While preferred embodiments of the invention have been shown and described, various changes may be made therein without departing from the spirit of the invention as defined in the appended claims.

The invention having thus been described what is claimed and desired to be protected by Letters Patent is:

1. In a multiple tubing string well installation, a tubing head bonnet having an upper flat surface and a plurality of fluid passageways opening through said surface and being substantially equally radially spaced from a predetermined center; sector-shaped flanges, each flange being of integral construction and having upper and lower surfaces, an outer arcuate edge, side edges converging from said outer edge to an inner apex, and an arcuate shoulder projecting downward from said outer edge, said flanges individually overlying said passageways and being assembled in circular formation with said lower surfaces spaced upwardly from said flat surface, with adjacent side edges of adjacent flanges confronting each other, with said apieces meeting at said center, and with said shoulders engaging said flat surface and being concentric with the passageways overlaid by their respective flanges; a valve tube connected to each flange closely adjacent to its apex and in alignment with the passageway overlaid by its associated flange, said tubes extending upward from said bonnet and clustered closely about said center, each tube having a lower end communicating with its aligned passageway, each flange having openings on opposite sides of its associated tube and adjacent to its respective side edges; threaded studs secured to said bonnet and individually extending upward through said openings; and nuts releasably threaded on said studs and tightened down against the upper surfaces of said flanges for applying downward leveraging force to each tube on opposite sides thereof, said force acting on said tube about its associated shoulder as an axis thereby urging the lower end of each tube into fluid-tight relation with its respective passageway.

2. The installation of claim 1 wherein said lower ends of the tubes are releasably fitted in their respectively aligned passageways, wherein said tubes have outwardly projecting flanges underneath and engageable with the lower surfaces of their respective sector-shaped flanges, and wherein the sector-shaped flanges are slidably fitted around their respective tubes, said nuts forcing said lower surfaces of the sector-shaped flanges against the flanges on said tubes for establishing fluid-tight engagement of said tubes in their respective passageways.

3. The installation of claim 1 wherein said sector-shaped flanges are integral with their respective tubes, and wherein seal rings are positioned between said flat surface and said lower surfaces in individually circumscribing relation to aligned tubes and passageways, said nuts placing said rings under compression thereby to establish fluid-tight relation between said tubes and their respective passageways.

References Cited in the file of this patent

UNITED STATES PATENTS

| 856,140 | Griesser | June 4, 1907 |
| 1,320,735 | Chapman | Nov. 4, 1919 |
| 1,525,647 | Haughey | Feb. 10, 1925 |
| 2,335,355 | Penick | Nov. 30, 1943 |
| 2,857,929 | Whitlock | Oct. 28, 1958 |
| 2,885,005 | Rhodes | May 5, 1959 |
| 2,939,727 | Allen | June 7, 1960 |

FOREIGN PATENTS

| 8,124 | Great Britain | June 4, 1888 |